(12) United States Patent
Wedel

(10) Patent No.: US 7,773,094 B2
(45) Date of Patent: Aug. 10, 2010

(54) METHOD AND DEVICE FOR THE DISPLAY OF IMAGES

(75) Inventor: Matthias Wedel, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 544 days.

(21) Appl. No.: 11/847,923

(22) Filed: Aug. 30, 2007

(65) Prior Publication Data

US 2008/0062174 A1 Mar. 13, 2008

(30) Foreign Application Priority Data

Sep. 8, 2006 (DE) ........................ 10 2006 042 386

(51) Int. Cl.
*G09G 5/00* (2006.01)
*G09G 5/26* (2006.01)
*G06T 17/00* (2006.01)
*G06K 9/32* (2006.01)
*H04N 5/46* (2006.01)
*H04N 7/01* (2006.01)
*H04N 1/46* (2006.01)

(52) U.S. Cl. ........................ 345/606; 345/428; 345/581; 345/670; 345/472.1; 348/441; 348/556; 358/525; 358/451; 382/295; 382/298; 382/299; 382/300

(58) Field of Classification Search ................. 345/428, 345/581, 589, 606, 619, 643, 660, 670, 472, 345/472.1; 348/441, 467, 469, 538, 556, 348/558, 552; 358/525, 451, 447–448; 382/254, 382/274, 276, 293, 295, 298, 299–300

See application file for complete search history.

(56) References Cited

U.S. PATENT DOCUMENTS

| 5,619,226 A | 4/1997 | Cahill, III |
| 2002/0015042 A1* | 2/2002 | Robotham et al. .......... 345/581 |

(Continued)

FOREIGN PATENT DOCUMENTS

| EP | 0 731 600 A2 | 9/1996 |
| EP | 0 992 942 A1 | 4/2000 |

OTHER PUBLICATIONS

Translation and German Office Action dated Jan. 11, 2007 for DE 10 2006 042 386.0-53.

(Continued)

*Primary Examiner*—Wesner Sajous
(74) *Attorney, Agent, or Firm*—Brinks, Hofer, Gilson & Lione

(57) ABSTRACT

A device for the display of images with a data processing system is provided. The device includes a display device; a memory storing an original image comprising a number of pixels; and a processor operable to generate a second image on the basis of the original image. The second image is displayed on the display device. The display device has a lower resolution than the original image. The second image is displayed at a first time point using an interpolation function that reduces the number of pixels, and the processor operable to generate a shifted third image at a second, later time point for display on the display device. The shifted third image uses an interpolation function that reduces the number of pixels, the interpolation at the first time point differentiated from the interpolation carried out at the second time point.

17 Claims, 2 Drawing Sheets

U.S. PATENT DOCUMENTS

2006/0280360 A1* 12/2006 Holub .................. 382/162
2008/0036792 A1* 2/2008 Liang et al. ............. 345/660
2008/0192178 A1* 8/2008 Ben-David et al. ......... 349/68

OTHER PUBLICATIONS

L. Madrazo; Digital Image, A summary of basic concepts of digital image and image processing; ETH Zurich. Oct. 1997; http://caad.arch.ethz.ch/teaching/nds/ws98/computing/image/index.html; eHB.

Carl F. R. Weiman; Continuous Anti-Aliased Rotation and Zoom of Raster Images, General Electric, Daytona Beach, Florida, USA; ACM 1980, pp. 286-293, eHB.

David M. Mount; CMSC 427 Computer Graphics, Department of Computer Science, University of Maryland, US, 2004, pp. 1-131, eHB.

* cited by examiner

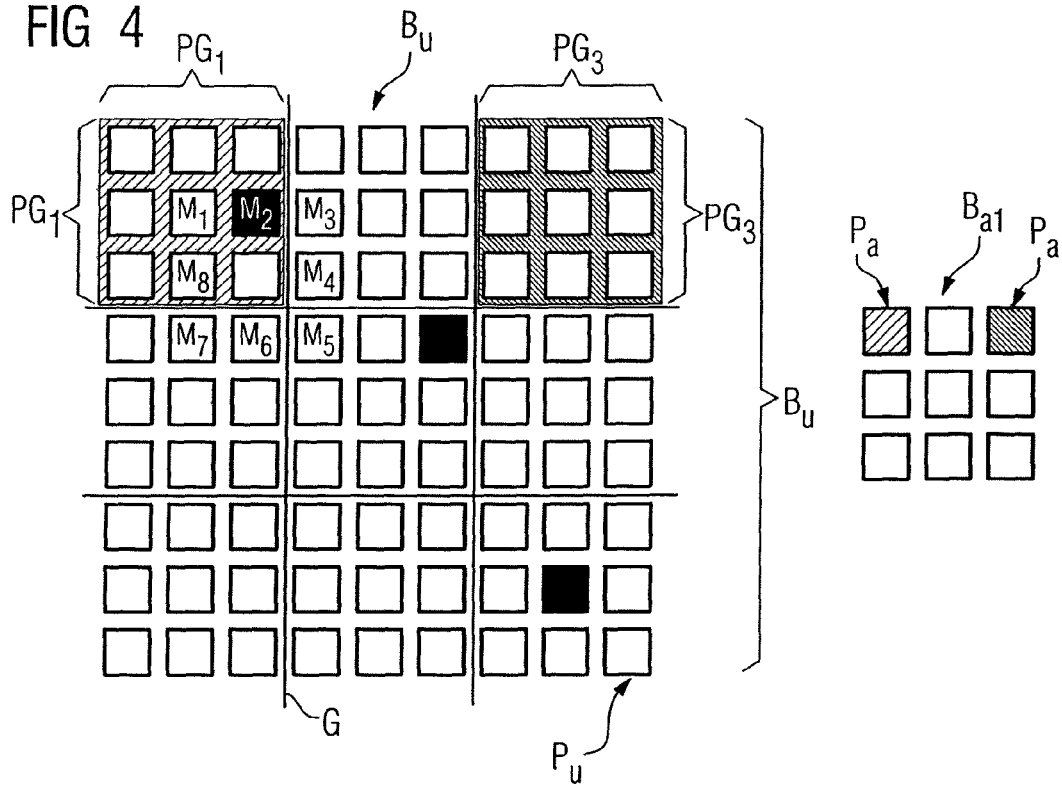
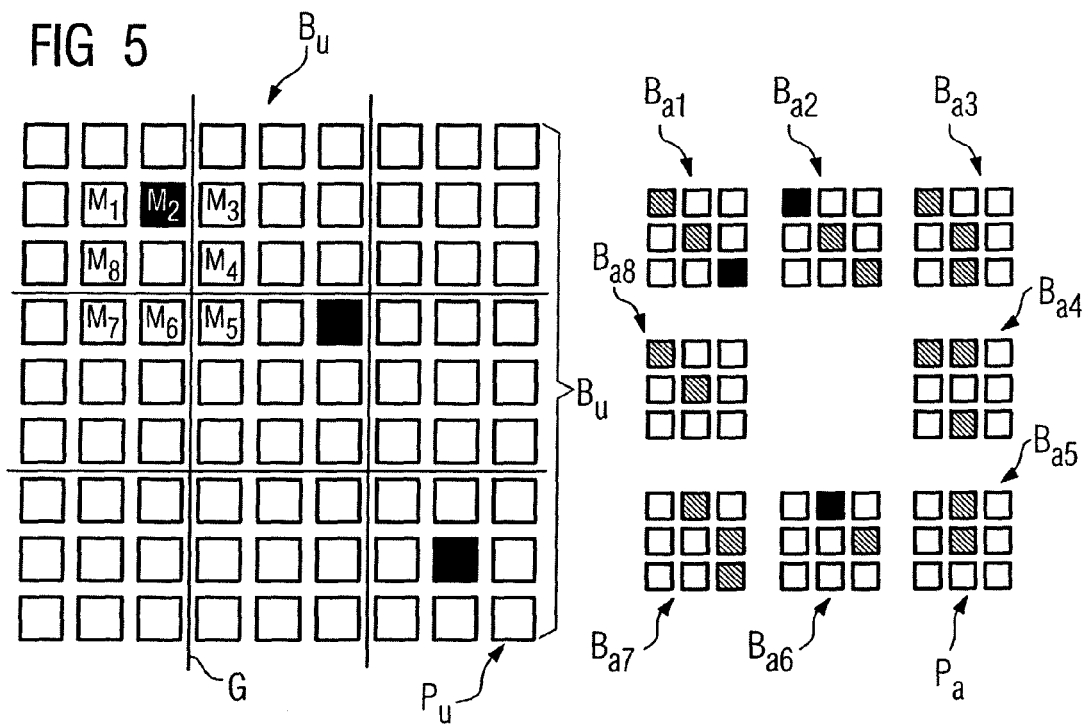

METHOD AND DEVICE FOR THE DISPLAY OF IMAGES

The present patent document claims the benefit of the filing date of DE 10 2006 042 386.0, filed Sep. 8, 2006.

BACKGROUND

The present embodiments relate to a method for displaying images and a device suitable for displaying images.

EP 0 731 600 B1 discloses a method and a device for generating an image with a high resolution. An image with a high resolution is generated from a sequence of moving images of low resolution.

EP 0 992 942 B1 discloses a method for smoothing a step effect in enlarged images of low resolution. This method improves the appearance of a digital image. In this method, several lines that pass through a pixel are first defined, and the gradient values assigned to the different lines are then calculated. The gradient values are then included in the determination of a new pixel value.

A digitalized image may be displayed by a display device, for example, a screen. A digitalized image frequently has a resolution that is higher than the resolution of the display device. Interpolation functions may be used to reduce the number of pixels of the digitalized image. A reduction in the number of pixels may lead to lost information.

To display parts of the image with optimum resolution, it is in principle also possible to show the relevant section of the image enlarged. The enlarged area may be displayed either on its own or together with unenlarged parts of the rest of the image, with the complete information of the image not being displayed in either case.

SUMMARY

The present embodiments may obviate one or more of the drawbacks or limitations inherent in the related art. For example, in one embodiment, an image that has a resolution, which is greater than the resolution of the display device provided for display of the image, is displayed with greatest possible information content.

In one embodiment, an image may be present in a digitalized form. A display device may be available to display the image. The display device may have a resolution less than the resolution of the image. The pixels of the displayed image are generated on the basis of pixels of the original image with the aid of at least one interpolation function. For example, the "nearest neighbor" interpolation or cubic spline may be used as the methods of interpolation. The image is, however, not static but instead is displayed in different ways at different time points. Different interpolations are performed to display the image in a succession of different positions. The image is displayed, with at least a slight shift, overall with an accuracy that would not be achievable with an image that was statically reproduced, so that other features of the image may be seen in detail with each interpolation.

Those pixels of the original image that are used as the source pixels for generation of a pixel of the image in the displayable resolution are designated as pixel groups. A pixel group is preferably formed to generate a pixel to be displayed at a specific time point, with no pixel groups being identical, with the time point being provided for the determination of a target pixel for the last preceding or the next succeeding display of the image. Each new display of the image is accompanied by at least a minimum shift of the image. Each new display of the image is accompanied by a changed interpolation in all or fewer parts of the image compared to the immediately preceding display. This also applies accordingly, as do all other aspects and developments of the present embodiments, to three-dimensional image data.

The pixel groups selected for the interpolation at the different time points may be moved into each other in a simple manner by shifting, for example, a rectangular, such as a square, area of the original image. The shifting of a pixel group to the next pixel group in chronological order may be expressed by a number of pixels. The number of pixels, which designates the amount of the shift in a specific direction, for example, as an X-direction or Y-direction, is preferably less than the quotient of the resolution of the original image in the same direction and the resolution of the displayable image, for example, the target image, in the corresponding direction. The quotient of the total number of pixels of the original image in the dimension in which the pixel group is shifted and the number of pixels by which the pixel group is shifted is greater than the total number of pixels of the displayed image in the corresponding dimension. The image is shifted by less than one pixel in the target image in a single step. If it is assumed that the coordinates of the display device define a fixed grid, the original image is shifted by small steps under this grid. In one embodiment, each individual shift step corresponds to only one pixel in the original image, for example, in the source image. Each single shift is as a rule associated only with slight changes in the displayed image. The change from one display to the next display does not have an irritating effect on the viewer. The change highlights details of the image.

In one embodiment, the depicted image is cyclically, repeatedly displayed in several positions offset relative to each other, with the different position in which the image is displayed in succession describing a closed curve. The repetition frequency with which this curve is described is advantageously between approximately 1 Hz and 12 Hz, so that the movement of the image may be perceived by the eye. The image may be stepwise shifted on an open curve, which does not repeat in a planned manner and may be followed by the human eye.

In one embodiment, the shift of the image takes place so quickly that it is not consciously perceptible. The image may, for example, be shifted on a circular, rectangular or stochastic path. When choosing the curve or path, all the source image points are displayed at any time point in the course of the image display so as to provide a maximum contribution to the target image. Fewer source image points may be displayed.

In one embodiment, an image is obtained whose wealth of detail is increased beyond the amount achievable by a fixed display using a slight, cyclical movement of an image that can be detected by the viewer. The image is obtained without distorting the image or fading or hiding parts of the image. The method of displaying the image may, for example, be used in medical technology such as for a mammography display on a standard monitor. Maps may, for example, be shown on screens of mobile telephones, graphics or text may be reproduced on small mobile devices such as MP3 players, or advertising graphics may be shown in large dimensions on LED displays. Noticeability may be increased by a continuous shift of the image.

BRIEF DESCRIPTION OF THE DRAWINGS

FIG. 4 is a diagram showing two example displays, broken down into pixels, with different resolutions.

FIG. 5 is a display similar to FIG. 4 showing different interpolations of an image in one embodiment.

DETAILED DESCRIPTION

Parts and parameters that correspond to each other are generally identified in the figures with the same reference designators.

Figure 1:
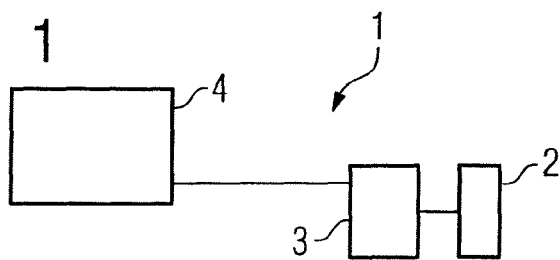
FIG. 1 shows one embodiment of an image processing system that enables an image with a higher resolution to be displayed on a display device with a lower resolution.

In one embodiment, as shown in FIG. 1, an image processing system 1 includes a data memory 2, a data processing system 3, and a display device 4, for example, a screen. The data memory 2 and the data processing system 3 may be realized in a single device or in a larger system, for example, in a data processing network. Images in the field of medical technology, for example, X-ray images or other computer tomographic images, are, for example, stored in a digitalized form in the data memory 2. The resolution of the original images $B_u$, designated as source images, may be higher than the maximum resolution of the display device 4.

Figure 2:
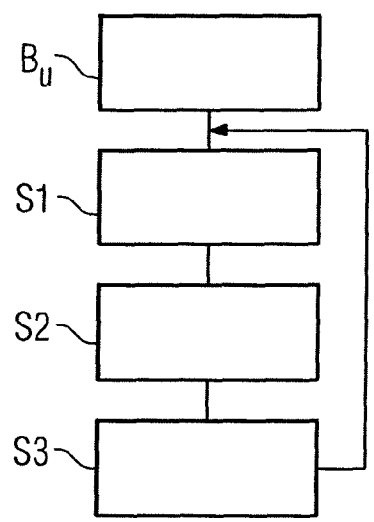
FIG. 2 is a flow diagram showing a method that may be performed with the image processing system in FIG. 1.

The data processing system 3 may be programmed in such a way that the method according to FIG. 2 is performed. The starting point of the method is the existing original image $B_u$ with the higher resolution, for example, the high number of pixels. In a first act S1, an interpolation is performed with which the number of pixels $P_u$ of the original image $B_u$ is reduced in order to obtain a displayable image $B_{a1}$, which has a reduced number of pixels $P_a$ compared to the original image $B_u$. The displayable image $B_{a1}$ is displayed in act S2 by the display device 4. In act S3, the original image $B_u$ is shifted slightly to again perform an interpolation in act S1, that because of the shift in the image $B_u$ is based on changed source data. The image $B_{a2}$ obtained in this way, also known as the target image, is again displayed in act S2, replacing the first target image $B_{a1}$.

Figure 3:
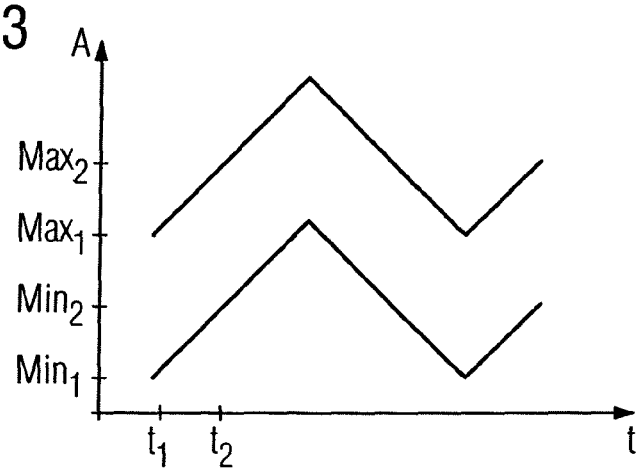
FIG. 3 is a diagram showing the shift of source pixels of an image in the context of the method according to FIG. 2.

In order to generate a certain number of pixels $P_a$ of the target image $B_{a1}$ from pixels $P_u$ of the original image $B_u$, pixel group $PG_1(t)$, which has a time-related composition and forms the basis for the interpolation to be performed, is determined within the original image $B_u$. In a one-dimensional view, as in FIG. 3, only a section A of a series of original pixels $P_u$ is considered. At a first time point $t_1$, section boundaries $Min_1$, $Max_1$ are specified in the series of pixels $P_u$ of the original image $B_u$. All pixels $P_u$ of the original image $B_u$ that lie between the first minimum value $Min_1$ and the first maximum value $Max_1$ form the first pixel group $PG_1(t_1)$, with this group having more than one pixel $P_u$. On the basis of this pixel group $PG_1(t_1)$, a pixel $P_a$ of the first target image $B_{a1}$ to be displayed at the first time point $t_1$ is determined. In one embodiment, a gray value, for example, calculated by forming an average from the gray values of the associated source pixels $P_u$, is assigned to the target pixel $P_a$.

The first target image $B_{a1}$ is substituted by the second target image $B_{a2}$ at time point $t_2$. The first pixel group $PG_1(t_1)$ is replaced by a second pixel group $PG_1(t_2)$ the limits of which are set by a second minimum value $Min_2$ and a second maximum value $Max_2$. As can be seen from FIG. 3, the second minimum value $Min_2$ lies between the first minimum value $Min_1$ and the first maximum value $Max_1$. The interval in which the source pixels $P_u$ on which the first interpolation is based are arranged thus intersects with the interval in which the source pixels $P_u$ on which the second interpolation is based are arranged. The change to the interval limits $Min_1$, $Max_1$, $Max_1$, $Max_2$ corresponds to a shift of the image $B_{a1}$, $B_{a2}$ displayed on the screen 4. The image $B_{a1}$, $B_{a2}$ is shifted in the same direction in each case in several successive steps until it is shifted back, step by step, into the original position. This process is cyclically repeated as often as required.

FIG. 4 shows the transition between the original image $B_u$ with a higher resolution and the image $B_{a1}$ of a lower resolution that can be displayed on the screen 4. The stored source image $B_u$ has 9×9 pixels $P_u$. The target image $B_{a1}$ has a resolution of 3×3 pixels $P_a$. A grid G that represents a raster, which corresponds to the resolution of the target image $B_{a1}$, is placed over the total of 81 source pixels $P_u$. Nine pixel groups $PG_1$, $PG_2$, $PG_9$ each with 3×3 pixels $P_u$ are defined in this way. By interpolation, for example, from the first pixel group $PG_1$ arranged in the top left of the source image $B_u$, a single target pixel $P_a$ is generated at the corresponding point of the target image $B_{a1}$. The markings of the pixel groups $PG_1$, $PG_3$ within the original image $B_u$ show the arrangement of the respective source pixels $P_u$ and the relationship to the arrangement of the assigned target pixels $P_a$ in FIG. 4 These markings do not contain gray value information.

The mid point of the first pixel group $PG_1$ existing at the first time point $t_1$ is designated as $M_1$ in FIGS. 4 and 5. To generate the second image $B_{a2}$ to be displayed at the second time point $t_2$, the grid G is shifted relative to the original image $B_u$ in such a way that the first pixel group $PG_1$ has the second midpoint $M_2$, which is offset relative to the first midpoint $M_1$ by an original pixel $P_u$. The shift of the source image $B_u$ relative to the grid G corresponds to a third pixel $P_a$ of the target image $B_{a1}$, $B_{a2}$. In further acts, a further shift by a single pixel $P_u$ takes place in each case, with a total of eight different midpoints $M_1$, $M_2$ ... $M_8$ existing that indicate all the possible positions of the original image $B_u$ relative to the grid G. The grid G is fixed relative to the display device 4. The totality of the mid points $M_1$, $M_2$, ... $M_8$, in this example, describes a closed curve that is cyclically followed and is shown in a visible migration of the image $B_{a1}$, $B_{a2}$ on the display device 4. In deviation from the representation according to FIG. 5 more wide-ranging or shorter, including also random, shifts of the target image $B_{a1}$, $B_{a2}$, are possible. The curve determined by the position of the mid points $M_1$, $M_2$ ... $M_8$ is described one to twelve times per second. This frequency may vary depending on the curve and the pixel ratio, for example, the quotient of the number of pixels of the target image $B_{a1}$, $B_{a2}$ and the number of pixels of the original image $B_u$.

In one embodiment, the composition of each pixel group $PG_1$, $PG_2$, ..., changes depending on the position of the midpoint $M_1$, $M_2$, ... $M_8$. At time point $t_1$, for example, the source pixels $P_u$ that belong to the first pixel group $PG_1(t_1)$= $PG_1(M_1)$ that are at the same time being arranged in the first three columns and in the first three lines of the source image $B_u$.

The example in FIG. 5 is based on a simplification of three possible gray values, for example, white, gray (shown hatched), and black. This applies for the pixels $P_u$ of the original image $B_u$ and equally for the pixels $P_a$ of the displayable target image $B_a$. From the nine source pixels $P_u$, in each case of a pixel group $PG_1$, $PG_2$, ..., a single target pixel $P_a$ is generated using the following rule(s). If the center pixel $P_u$ of a pixel group $PG_1$, $PG_2$, is black, the associated target pixel $P_a$ is also black. If all the source pixels $P_u$ of a pixel group $PG_1$, $PG_2$, ... are white, the associated target pixel $P_a$ is also white. In all other cases, for example, if the center pixel $P_u$ of a pixel group $PG_1$, $PG_2$, is white or if this pixel $P_u$ is adjacent to a black pixel $P_u$ within the pixel group $PG_1$, $PG_2$, the color gray is assigned to the target pixel $P_a$.

The color gray is assigned to the target pixel $P_a$, for example, at time point $t_1$ for pixel group $PG_1$. The associated displayable image $B_{a1}$ shows a pixel of gray color in the top left corner. At time point $t_2$, a black pixel $P_u$ moves into the center of the first pixel group $PG_1$. The associated pixel $P_a$ in the second displayable image $B_{a2}$ is black. A total of eight different target images $B_{a1}$, $B_{a2}$, . . . , which are displayed in succession, are generated by the changing composition of the pixel groups $PG_1$, $PG_2$, . . . , due to the fact that all the target images $B_{a1}$, $B_{a2}$, . . . , derive from different interpolations of the original image, the pattern of the contours are, for example, distinctly more clearly discernable than in the case of just one single constant interpolation.

The method performed according to the image processing system 1 has a particularly high tolerance with respect to errors in the display device 4. If, for example, there are display errors in individual pixels $P_a$, the errors, such as the failure of individual pixels $P_a$, are at least partially compensated for in that the information to be reproduced migrates on the display device 4. The information to be displayed is visible with a higher probability on at least some target images $B_{a1}$, $B_{a2}$, . . . The method performed according to the image processing system 1 may also have an increased perceptible resolution compared to a static image display.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method for displaying images, with the following features:
   accessing an original image comprising a number of pixels,
   generating a second image on the basis of the original image for display on a display device, the display device operable to display a number of pixels that is less than the number of pixels of the original image,
   displaying the second image at a first time point on the display device using an interpolation function that reduces the number of pixels, and
   displaying a positionally shifted third image at a second time point on the display device using an interpolation function that reduces the number of pixels, the interpolation at the first time point differentiated from the interpolation carried out at the second time point.

2. The method as claimed in claim 1, comprising: generating a second target pixel to be displayed at a second time point as a function of the pixels of the original image, which are used as the source pixels, to form a second pixel group that is differentiated from a first pixel group used at the first time point to generate a first target pixel.

3. The method as claimed in claim 2, comprising: deriving the second pixel group used at the second time point to generate a second target pixel as a function of the first pixel group used to generate the corresponding target pixel by shifting the individual source pixels of the first pixel group.

4. The method as claimed in claim 3, wherein a quotient of the total number of pixels of the original image in the dimension in which the pixel group is shifted and the number of pixels by which the pixel group (is shifted is greater than a total number of pixels of the displayed image in a corresponding dimension.

5. The method as claimed in claim 4, comprising: shifting the second pixel group used at the second time point to generate the second target pixel by one pixel relative to the first pixel group used at the first time point to generate the first target pixel.

6. The method as claimed in claim 1, wherein the second image and additional images are cyclically displayed in several positions offset relative to each other.

7. The method as claimed in claim 6, wherein the different positions in which the second and additional images may be successively displayed on a closed curve.

8. The method as claimed in claim 7, wherein the frequency with which the second image passes through the closed curve is at least 1 Hz.

9. The method as claimed in claim 7, wherein the frequency with which the second image passes through the closed curve is not more than 12 Hz.

10. The method as claimed in one of claims 1, wherein the second and additional images are successively displayed in several positions offset relative to each other that describe a curve which is not closed.

11. A device for the display of images with a data processing system, the device comprising:
    a display device;
    a memory storing an original image comprising a number of pixels; and
    a processor operable to generate a second image on the basis of the original image, the second image displayed on the display device, the display device having a lower resolution than the original image, the second image being displayed at a first time point using an interpolation function that reduces the number of pixels, and the processor operable to generate a shifted third image at a second, later time point for display on the display device, the shifted third image using an interpolation function that reduces the number of pixels, the interpolation at the first time point differentiated from the interpolation carried out at the second time point.

12. The device according to claim 11, wherein the display device includes a screen of a mobile telephone.

13. The device according to claim 12, wherein the original image includes a map.

14. The device according to claim 11, wherein the display device includes a screen of a MP3 player.

15. The device according to claim 14, wherein the original image includes a graphic or text data.

16. The device according to claim 11, wherein the display device includes a LED display.

17. The device according to claim 16, wherein the original image includes an advertisement.

* * * * *